(12) United States Patent
Dehlsen

(10) Patent No.: US 11,701,616 B2
(45) Date of Patent: *Jul. 18, 2023

(54) SORBENT EMITTER FOR DIRECT AIR CAPTURE OF CARBON DIOXIDE

(71) Applicant: Dehlsen Associates of the Pacific Limited, Warkworth (NZ)

(72) Inventor: James George Purnell Dehlsen, Warkworth (NZ)

(73) Assignee: DEHLSEN ASSOCIATES OF THE PACIFIC LIMITED, Warkworth (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 17/726,434

(22) Filed: Apr. 21, 2022

(65) Prior Publication Data

US 2022/0241727 A1 Aug. 4, 2022

Related U.S. Application Data

(60) Continuation-in-part of application No. 17/391,884, filed on Aug. 2, 2021, which is a continuation-in-part (Continued)

(51) Int. Cl.
*B01D 53/14* (2006.01)
*B01D 53/18* (2006.01)
(Continued)

(52) U.S. Cl.
CPC ......... *B01D 61/08* (2013.01); *B01D 53/1475* (2013.01); *B01D 53/1493* (2013.01);
(Continued)

(58) Field of Classification Search
CPC ............... B01D 61/08; B01D 53/1475; B01D 53/1493; B01D 53/185; B01D 61/025;
(Continued)

(56) References Cited

U.S. PATENT DOCUMENTS 4,350,895 A 9/1982 Cook
4,919,060 A 4/1990 Cady
(Continued)

FOREIGN PATENT DOCUMENTS

AU 2019226096 A1 10/2020
BR PI1001623-6 A2 7/2011
(Continued)

*Primary Examiner* — Pranav N Patel

(57) ABSTRACT

An emitter apparatus is mounted on a marine structure powered by wind or marine hydrokinetic energy to disperse a carbon dioxide sorbent such as sodium hydroxide. The sorbent can be generated by reverse osmosis of seawater with electrolysis of the brine, or delivered from an external supply. Suitable marine structures include offshore wind turbines, marine hydrokinetic generators, offshore oil platforms, merchant vessels, and other fixed and mobile structures. Effective capture is made by dispersing a fine mist or fog of aqueous sorbent from nozzles with a particle size from a nozzle of less than 100 microns. The sorbent reacts with atmospheric carbon dioxide forming carbonates and bicarbonates, which drift and fall to the ocean surface, reducing surface acidity and capturing additional atmospheric carbon dioxide via absorption at the local ocean surface. The resulting carbonates sink to the ocean floor and are there sequestered.

20 Claims, 7 Drawing Sheets

Related U.S. Application Data of application No. 17/163,295, filed on Jan. 29, 2021, which is a continuation-in-part of application No. 17/087,309, filed on Nov. 2, 2020, which is a division of application No. 16/129,783, filed on Sep. 12, 2018, now abandoned.

(51) Int. Cl.

| | | |
|---|---|---|
| *B01D 61/08* | (2006.01) | |
| *B01D 61/02* | (2006.01) | |
| *B01D 61/10* | (2006.01) | |
| *B01D 63/06* | (2006.01) | |
| *B63B 43/06* | (2006.01) | |
| *B63B 1/04* | (2006.01) | |
| *B63B 77/00* | (2020.01) | |
| *B63B 75/00* | (2020.01) | |
| *C02F 103/08* | (2006.01) | |
| *B63B 43/04* | (2006.01) | |
| *B63B 35/44* | (2006.01) | |
| *B63B 39/03* | (2006.01) | |
| *B63B 1/10* | (2006.01) | |

(52) U.S. Cl.
CPC ......... *B01D 53/185* (2013.01); *B01D 61/025* (2013.01); *B01D 61/026* (2022.08); *B01D 61/10* (2013.01); *B01D 63/06* (2013.01); *B63B 1/048* (2013.01); *B63B 43/06* (2013.01); *B63B 75/00* (2020.01); *B63B 77/00* (2020.01); *B01D 2251/304* (2013.01); *B01D 2251/604* (2013.01); *B01D 2313/06* (2013.01); *B01D 2313/20* (2013.01); *B01D 2313/54* (2013.01); *B01D 2313/56* (2013.01); *B01D 2315/06* (2013.01); *B01D 2317/04* (2013.01); *B01D 2317/06* (2013.01); *B63B 1/107* (2013.01); *B63B 39/03* (2013.01); *B63B 2001/044* (2013.01); *B63B 2035/442* (2013.01); *B63B 2043/047* (2013.01); *C02F 2103/08* (2013.01); *C02F 2201/007* (2013.01); *C02F 2201/008* (2013.01); *C02F 2303/10* (2013.01); *C02F 2307/00* (2013.01)

(58) Field of Classification Search
CPC ...... B01D 61/026; B01D 61/10; B01D 63/06; B01D 2251/304; B01D 2251/604; B01D 2313/06; B01D 2313/20; B01D 2313/54; B01D 2313/56; B01D 2315/06; B01D 2317/04; B01D 2317/06; B63B 1/048; B63B 43/06; B63B 75/00; B63B 77/00; B63B 1/107; B63B 39/03; B63B 2001/044; B63B 2035/442; B63B 2043/047; C02F 2103/08; C02F 2201/007; C02F 2201/008; C02F 2303/10; C02F 2307/00

See application file for complete search history.

(56) References Cited

U.S. PATENT DOCUMENTS

| | | |
|---|---|---|
| 7,731,375 B2 | 6/2010 | Palmer et al. |
| 7,754,169 B2 | 7/2010 | Constantz et al. |
| 7,821,148 B2 | 10/2010 | Piasecki et al. |
| 7,939,957 B2 | 5/2011 | Costin |
| 8,291,714 B2 | 10/2012 | Omielan et al. |
| 8,328,515 B2 | 12/2012 | Dawoud et al. |
| 8,405,236 B2 | 3/2013 | David |
| 8,702,847 B2 | 4/2014 | Lackner et al. |
| 8,932,024 B2 | 1/2015 | Hayashi et al. |
| 8,933,575 B2 | 1/2015 | Lipman |
| 9,260,314 B2 | 2/2016 | Constantz et al. |
| 2002/0071235 A1 | 7/2002 | Gorczyca et al. |
| 2021/0387133 A1 | 12/2021 | Lackner et al. |

FOREIGN PATENT DOCUMENTS

| | | | |
|---|---|---|---|
| CA | 2367715 C | | 4/2007 |
| CN | 101415937 B | | 5/2011 |
| CN | 203058157 U | | 7/2013 |
| CN | 2863263 Y | | 12/2015 |
| CN | 214629373 U | | 11/2021 |
| EP | 2067964 B1 | | 2/2013 |
| JP | 2008063960 A | | 3/2008 |
| JP | 6639212 B2 | | 2/2020 |
| NL | 1023999 C1 | | 1/2005 |
| RU | 2436708 C1 | | 12/2011 |
| RU | 2642203 C2 | | 1/2018 |
| WO | WO2008115662 | * | 9/2008 |
| WO | WO2011011740 | * | 1/2011 |
| WO | 2019165151 A1 | | 8/2019 |

* cited by examiner

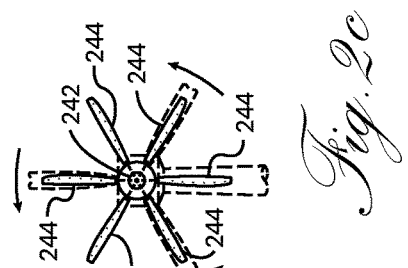
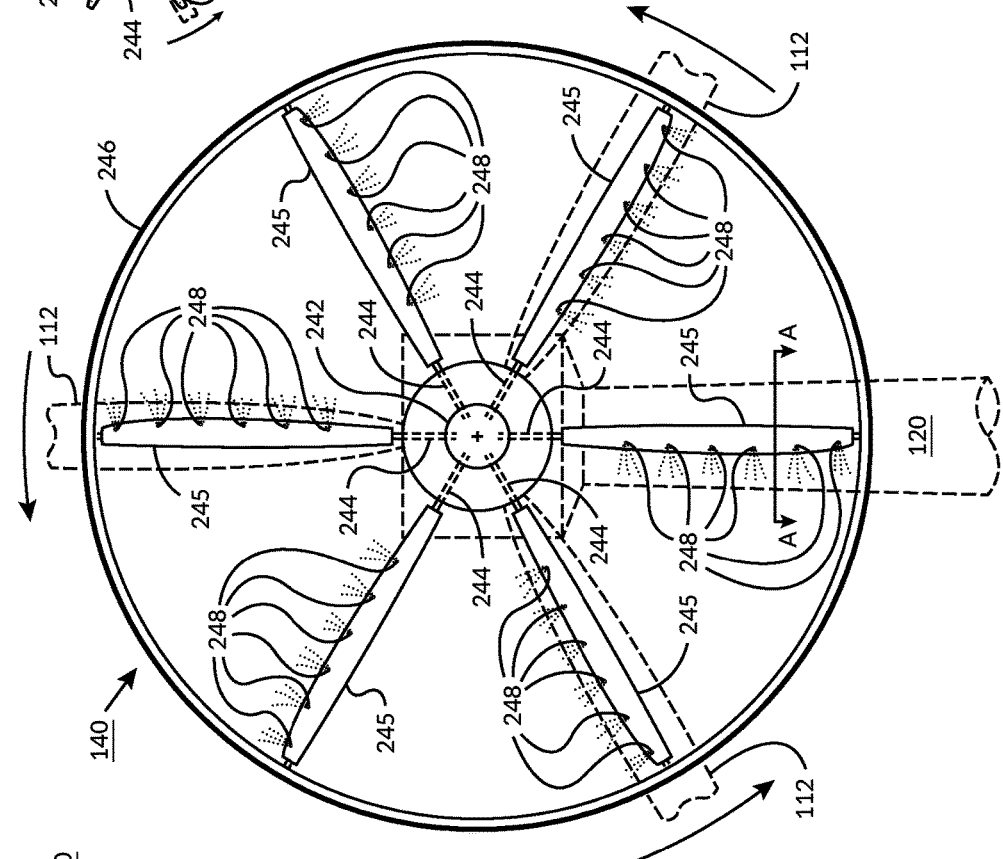
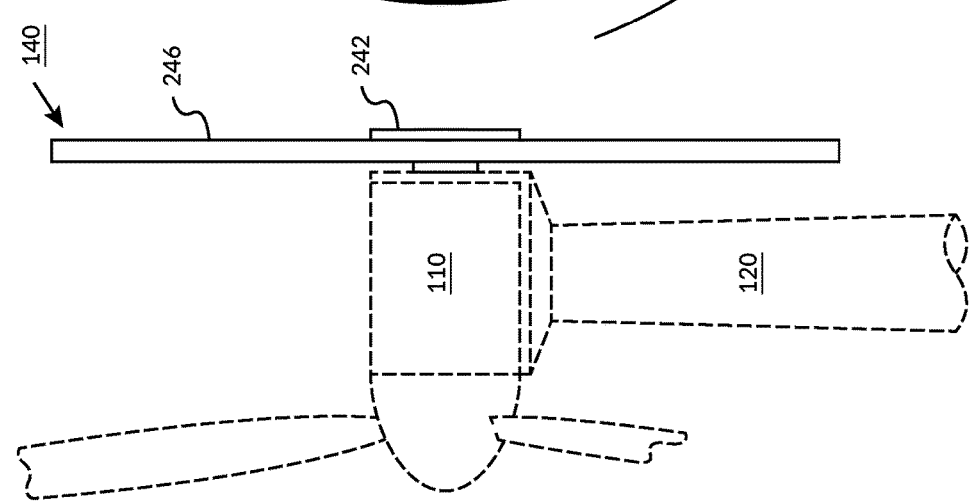

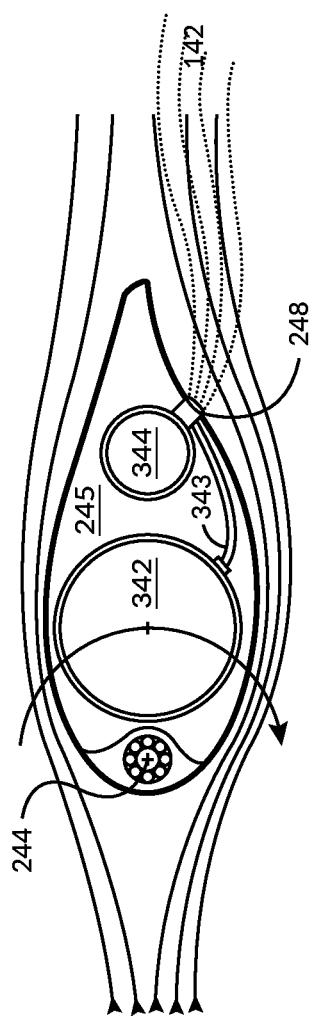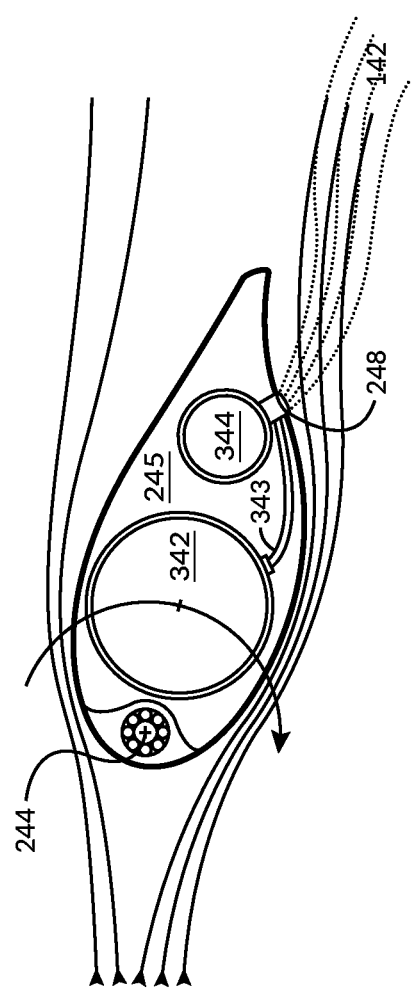

SORBENT EMITTER FOR DIRECT AIR CAPTURE OF CARBON DIOXIDE

CROSS-REFERENCE TO RELATED APPLICATIONS

The present application claims priority to and is a continuation-in-part application of U.S. patent application Ser. No. 17/391,884, filed on Aug. 2, 2021, and entitled "Wind-Powered Direct Air Carbon Dioxide Capture for Ocean Sequestration," which is a continuation-in-part of U.S. patent application Ser. No. 17/163,295, entitled "Wind and Wave Desalination Vessel," and filed on Jan. 29, 2021, which is a continuation-in-part of U.S. patent application Ser. No. 17/087,309, entitled "Reverse Osmosis Water Production Apparatus," and filed on Nov. 2, 2020, which claims priority to U.S. patent application Ser. No. 16/129,783, entitled "Reverse Osmosis Water Production Apparatus," and filed on Sep. 12, 2018, which claims priority to New Zealand Patent Application Publication No. 735,748, entitled "Reverse Osmosis Water Production Apparatus," and filed on Sep. 22, 2017, the entire disclosures of which are all incorporated by reference herein.

BACKGROUND OF THE INVENTION

1. Field of Invention

This invention relates to the sequestration of atmospheric carbon dioxide.

2. Description of Related Art

Deep reductions in carbon dioxide ($CO_2$) emissions are required to reduce atmospheric $CO_2$ concentration, mitigating global heating. Carbon dioxide is a greenhouse gas that absorbs and radiates heat from the sun. $CO_2$ concentrations are rising primarily because fossil fuels are burned for power production, the $CO_2$ trapping additional heat and raising Earth's average temperature. The scale needed to transform the world's primary energy sources from carbon-emitting fossil fuels to renewable energy is vast. It requires an impractical transition rate, indicating that carbon dioxide capture and storage are imperative to achieving the level of future $CO_2$ reduction needed to combat global warming and climate change.

Current techniques for carbon capture are directed at capturing $CO_2$ from large stationary sources, such as power plants. Typically, $CO_2$ is separated from flue gas, compressed, and transported to be sequestered underground.

Direct ambient air capture (DAC) of $CO_2$ occurs when ambient air passes across an alkaline solution, such as sodium hydroxide. However, various DAC methods have proved costly due to the energy needed to process sufficient amounts of air to capture dilute (~419 ppm) atmospheric $CO_2$, the cost and delivery of the alkaline feedstock, the recovery of the feedstock, the transfer and containment of the $CO_2$ to be sequestered, and the large land area and structures needed for the air processing system.

Water loss may be substantial in an air capture system as the relatively low concentration of $CO_2$ in the atmosphere requires a large amount of interaction between the gaseous and the liquid phases. Freshwater availability is a significant problem in many parts of the world. As rising atmospheric temperatures drive changes in the hydrological cycle, water availability for DAC is often limited. In a typical DAC system, water loss is about 20 moles for every mole of $CO_2$ absorbed (at 15 degrees C. and 65% RH). However, it can be lowered significantly by appropriate design and operating parameters.

It is compelling to look beyond land-based $CO_2$ sequestration to the oceans for both process water availability and the sequestration of $CO_2$, mimicking parts of the natural cycle of ocean $CO_2$ absorption and helping to reduce the acidification of the oceans. Rising atmospheric $CO_2$ has led to more $CO_2$ dissolving into the sea and a drop in average pH (now about 8.1).

SUMMARY OF THE INVENTION

The present invention overcomes these and other deficiencies of the prior art by capturing atmospheric $CO_2$ by dispersing, via a sorbent emitter placed on a wind or marine current turbine platform, a sorbent such as aqueous sodium hydroxide (NaOH) into the wind above an ocean surface. Effective capture of $CO_2$ is achieved by dispersing a fine mist or fog of the aqueous sorbent with a particle size from a nozzle of less than 100 microns. The sorbent reacts with atmospheric $CO_2$ forming carbonates and bicarbonates, which drift and fall to the ocean surface, reducing ocean acidity and capturing additional atmospheric $CO_2$ via absorption at the local ocean surface. The resulting carbonates sink to the ocean floor and are there sequestered.

In an embodiment where the sorbent emitter is fitted to an offshore turbine, the turbine powers onboard desalination to deliver fresh water to shore and processes the residual brine into the $CO_2$ sorbent. The sorbent can be diluted with water and pumped to nozzles on the tower head. Sorbent may also be delivered to the offshore wind turbine via a pipeline or by a merchant vessel, thereby allowing the power generated by the turbine to produce more desalinated water or shore power rather than onboard production of the sorbent.

In an embodiment of the invention, a carbon dioxide sorbent emitter system comprises: a sorbent emitter apparatus comprising a hub; and a plurality of spokes, wherein each one of the plurality of spokes is paired with an aerodynamic foil, each aerodynamic foil comprising a plurality of carbon dioxide sorbent emitting nozzles; and an offshore platform supporting the sorbent emitter apparatus above a marine surface. The sorbent emitter apparatus further comprises a rim coupled to the plurality of spokes. The offshore platform comprises a wind turbine generator or marine hydrokinetic energy generator and a desalination system, wherein the wind turbine generator or marine hydrokinetic energy generator powers the desalination system, and the desalination system produces brine for processing into carbon dioxide sorbent on the offshore platform. The carbon dioxide sorbent is sodium hydroxide emitted from the plurality of sorbent emitting nozzles. The sorbent emitter apparatus is mounted to the wind turbine generator. The hub and the plurality of spokes rotate about a horizontal axis. The plurality of spokes rotate about a vertical axis. A pitch of each aerodynamic foil is adjustable. Each aerodynamic foil comprises a carbon dioxide sorbent feeder tube and an air feeder tube, and the hub comprises a swivel tube connector connected to the carbon dioxide sorbent feeder tube of each aerodynamic foil. A size of the plurality of the carbon dioxide sorbent emitting nozzles is adjustable. The offshore platform is a ship or oil drilling platform.

In another embodiment of the invention, a method of dispersing carbon dioxide sorbent in a marine environment to sequester atmospheric carbon dioxide, the method comprising the steps of: coupling a carbon dioxide sorbent emitter apparatus to an offshore platform, wherein the carbon dioxide sorbent emitter apparatus comprises a hub, a plurality of spokes, wherein each one of the plurality of spokes includes an aerodynamic foil, each aerodynamic foil comprising a plurality of carbon dioxide sorbent emitting nozzles, and the offshore platform supports the sorbent emitter apparatus above a marine surface, and dispersing carbon dioxide sorbent through the plurality of carbon dioxide sorbent emitting nozzles.

The offshore platform comprises a wind turbine generator or marine hydrokinetic energy generator and a desalination system, and the method further comprises processing brine from the desalination system into carbon dioxide sorbent. The method further comprises the step of rotating the hub and the plurality of spokes about a horizontal axis. The method further comprises the step of rotating the plurality of spokes about a vertical axis. The method further comprises the step of adjusting a pitch of each aerodynamic foil. The method further comprises the step of adjusting a size of the plurality of the carbon dioxide sorbent emitting nozzles. The offshore platform may also be a ship or oil drilling platform.

The foregoing and other features and advantages of the invention will be apparent from the following, a more detailed description of the invention's preferred embodiments, as shown in the accompanying drawings and the claims.

BRIEF DESCRIPTION OF THE DRAWINGS

For a complete understanding of the present invention and its advantages, reference is now made to the ensuing descriptions taken in connection with the accompanying drawings briefly described as follows.

FIGS. 2A-2C illustrate the side and front views of the sorbent emitter apparatus atop the offshore wind turbine system in FIG. 1.

FIGS. 3A and 3B illustrate a cross-sectional view of a spoke and a foil of the sorbent emitter apparatus in FIG. 1.

DETAILED DESCRIPTION OF PREFERRED EMBODIMENTS

Figures 1A, 1B:
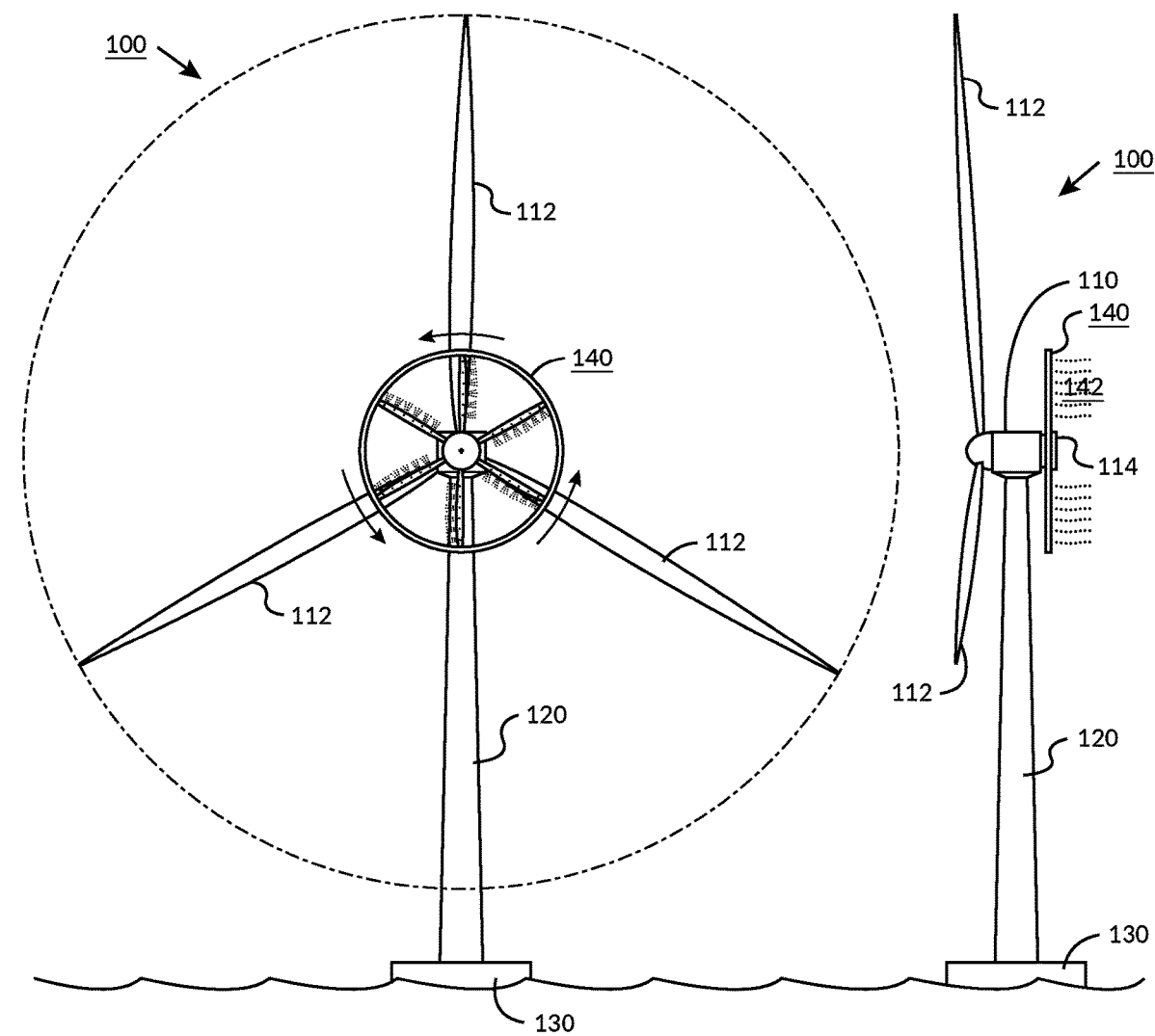
FIGS. 1A and 1B illustrate front and side views of an offshore wind turbine system with a sorbent emitter apparatus according to an embodiment of the invention.

Preferred embodiments of the present invention and their advantages may be understood by referring to FIGS. 1-7, wherein like reference numerals refer to like elements. The present invention may be deployed in any water environment, preferably where renewable energy is available. It can also be configured to use a range of alkaline $CO_2$ absorbents apart from sodium hydroxide (NaOH).

The present invention is a continuation of U.S. patent application Ser. No. 17/391,884, entitled "Wind-Powered Direct Air Carbon Dioxide Capture for Ocean Sequestration," which teaches locating sorbent emitter nozzles on the blades or structure of an offshore wind turbine. Blade rotation enhances sorbent dispersion, and the turbine's height above the ocean allows sufficient air retention time for the sorbent mist particles to mix in the atmosphere and react with $CO_2$. The air running through the rotor can travel for tens of kilometers downwind in an hour. Shifting wind direction creates an expansive ocean area where the carbonates are deposited. However, locating the emitter nozzles on the turbine blades requires the onshore manufacturing and offshore installation of new turbines and platforms. There is a need to adapt existing offshore turbines and platforms to utilize aftermarket sorbent emitters to accelerate sorbent emission and capture $CO_2$.

FIGS. 1A and 1B illustrate front and side views of an offshore wind turbine system 100 according to an embodiment of the invention. The system 100 comprises a wind turbine generator (WTG) 110 with rotor blades 112, a tower (mast) 120, and a platform 130 fixed or floating with anchoring to a seafloor. The platform 130 can be a spar buoy, as disclosed in U.S. patent application Ser. No. 17/391,884, which houses reverse osmosis components to generate NaOH solution as a by-product of desalinating seawater into freshwater.

As an alternative to the turbine blade-mounted nozzles as disclosed in the above-noted application, a sorbent emitter apparatus 140 is mounted or retrofitted to a bedplate 114 of the WTG 110 as shown or fixed to the turbine tower 120 or the platform 130. In a preferred embodiment of the invention, the sorbent emitter apparatus 140 is located at a height at least 30 m above the ocean surface for optimal NaOH/$CO_2$ absorption. Moving the sorbent emitter apparatus 140 away from the blades 112 of the WTG 110 allows it to be deployed rapidly in practice by retrofitting already operating offshore turbines, eliminating the deployment delay associated with newly built wind turbines. Due to the urgency of carbon dioxide removal from the atmosphere, adapting existing offshore turbines is critical to gaining sufficient carbon capture to help mitigate rising global temperatures.

The NaOH solution is internally piped to the sorbent emitter apparatus 140 and emitted as a fine mist 142 into the atmosphere. Atmospheric $CO_2$ is absorbed by the NaOH mist 142, forming sodium carbonate and sodium hydrogen carbonate ("sodium bicarbonate"). The carbonate droplets are drawn by gravity to the surface layer of the ocean, where mixing by the orbital action of waves leads to increased levels of dissolved carbonates and gradual capture by marine organisms and incorporation into the natural carbon cycle. The reaction solution drops landing on the ocean are mildly alkaline, comprising a mixture of carbonate, bicarbonate, and unreacted hydroxide ions. Therefore, the present invention has the potential to locally reduce ocean acidity with the associated benefits to marine ecosystems.

Referring to FIGS. 2A-2C, which show side and front views of the sorbent emitter apparatus 140 atop the WTG 110. The sorbent emitter apparatus 140 is a fixed or rotating wheel-type structure, with a hub 242 and multiple spokes 244. On each spoke 244 is an aerodynamic foil 245. As shown in FIGS. 2A and 2B, the sorbent emitter apparatus 140 may include a circular rim 246 coupled to the spokes 244. As shown in FIG. 2C, the spokes 244 are rigid and supported only by the hub connection 242 without the rim 246. The spoke structure offers high nozzle density along the length of each spoke 244 while having a narrow foil 245 profile area (low solidity) to help minimize the drag/resistance to the air flowing through the blades 112 and the sorbent emitter apparatus 140.

The foils 245 house internal sorbent plumbing and exterior surface sorbent nozzles 248 and optional internal air plumbing to the nozzles 245. In an exemplary embodiment of the invention, the aqueous sodium hydroxide sorbent flows through a hollow axle of the hub 242 to tubing within each foil 245. Misting nozzles 248 may require an air supply, which can be plumbed through the hub axel or by having electric power delivered to the hub 242 to drive a compressor(s) for the air supply to the air plumbing.

FIGS. 3A and 3B illustrate a cross-sectional view of a spoke 244 and a foil 245 along the cut-axis A-A (as marked in FIG. 2). Each foil 245 houses an air feeder tube 342, a sorbent solution feeder tube 344, and a plurality of external nozzles 248. The air feeder tube 342 is coupled to nozzles 248 via a tube 343. Each foil 245 is pitchable by rotating a respective spoke 244. FIG. 3A illustrates the foil 245 in a feathered position with no rotation. FIG. 3B illustrates the foil 245 in a rotated position. The nozzles 248 are placed near or at the foil trailing edge to cause minimal disturbance of the airflow over the foil 245, help disperse the sorbent mist 142 from nozzles 248, and reduce drag.

Figure 4:
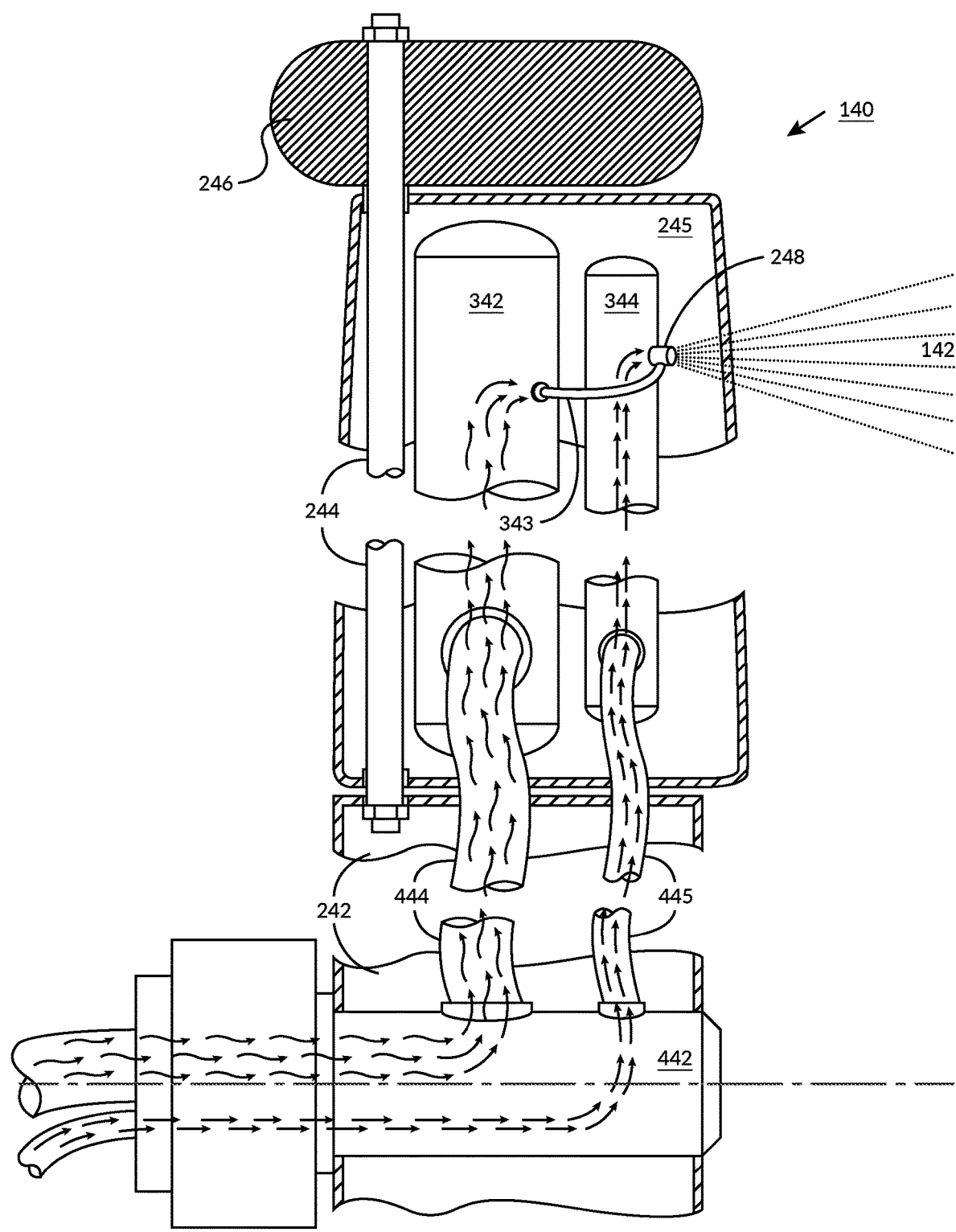
FIG. 4 illustrates the sorbent emitter apparatus's inner air and sorbent plumbing according to an embodiment of the invention.

FIG. 4 illustrates the inner air and sorbent plumbing of the sorbent emitter apparatus 140 according to an embodiment of the invention. A spoke 244 connects to the hub 242 and the rim 246, if needed, for example, in a large-scale structure (10 m or more diameter). The hub 242 contains swivel tube connectors (not shown) in the hub's axel 442. From these axel tubes, flexible tubing 444 and 445 connect to the spoke-mounted feeder tubes 342 and 344, which convey the air and sorbent solution, respectively, to nozzles 248. The flexible tubing 444 and 445 allows for the foil 245 pitching movement.

The aerodynamic foil 245 containing feeder tubes and nozzles can be either fixed or actively rotated/pitched around the axis of the spoke on which the assembly of feeder tubes 342 and 344 and nozzles 248 is mounted. Collective pitch control for all the aerodynamic foils 245 is actuated by a motor (not shown) in the rim 246, the hub 242, or spokes 244. By pitching each foil 245, an aerodynamic lift is created to provide torque at the hub 242 to drive a generator to pump air and the sorbent fluid to the nozzles 248.

Nozzles that move across the wind gain more exposure to the air passing around each nozzle 248 than nozzles stationary in the wind. Thus, rotation of the emitter 140 on its axle provides greater dispersion of the emitted sorbent mist 142 and exposure to more of the sparse atmospheric $CO_2$ (417 ppm) closer to the emitter 140. This increases sorbent droplet dispersion by more air volume exposure closer to the emission point. This also reduces the needed dwell time in the atmosphere for optimal $CO_2$ absorption, making it possible to have effective capture at lower heights above the ocean. Variations in the diameter of the emitter wheel 246, the number of spokes 244, the nozzle spacing on the spokes, and the structural requirements of the emitter 140 change the rate of sorbent misting.

Figure 5:
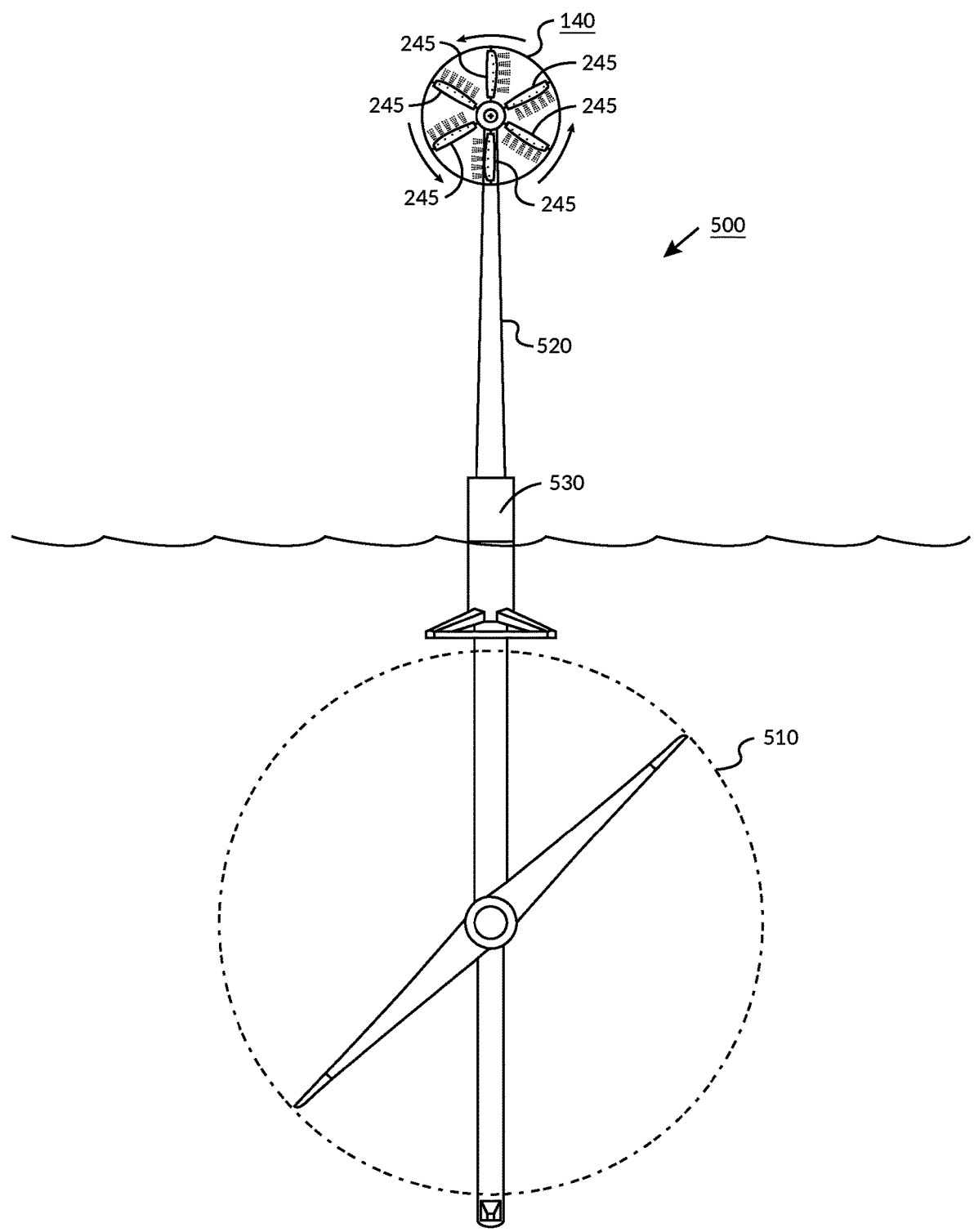
FIG. 5 illustrates a marine hydrokinetic energy (MHK) mounted sorbent emitter according to an embodiment of the invention.

While certain ocean regions may not have an adequately energetic wind resource for wind turbines, these regions may have sufficient marine currents to generate power. FIG. 5 illustrates a marine hydrokinetic energy (MHK) mounted sorbent emitter 500 according to an embodiment of the invention. Here, a surface piercing marine current power generator 510 serves as an effective structure for capturing $CO_2$ by mounting on the surface structure 530, a mast 520 with a sorbent emitter apparatus 140 at the masthead, where the sorbent emitter 140 is configured to yaw about the mast, either by aerodynamic drag positioning (weather vanning) with the wind or by motorized yawing. Wave energy and marine current platforms are permanently moored and positionally stable and thus provide a suitable base for a mast 520 with a radial emitter device 140. Power generated is applied onboard to desalinate water, process the brine, and produce and disperse the sorbent.

In poor wind resource regions, MHK generators with a sorbent emitter apparatus 140 can provide wide dispersion of carbonates on the ocean by slowly motoring the radial emitter while also yawing the emitter over a 360-degree dispersion zone around the platform for the carbonates to spread across the ocean surface and sink to the seabed. The sorbent emitter apparatus 140 is fitted with a motor-generator, whereby motoring the spoke foils 245 produces fan-like air movement, increasing the dispersion area of the sorbent emitted.

Figure 6:
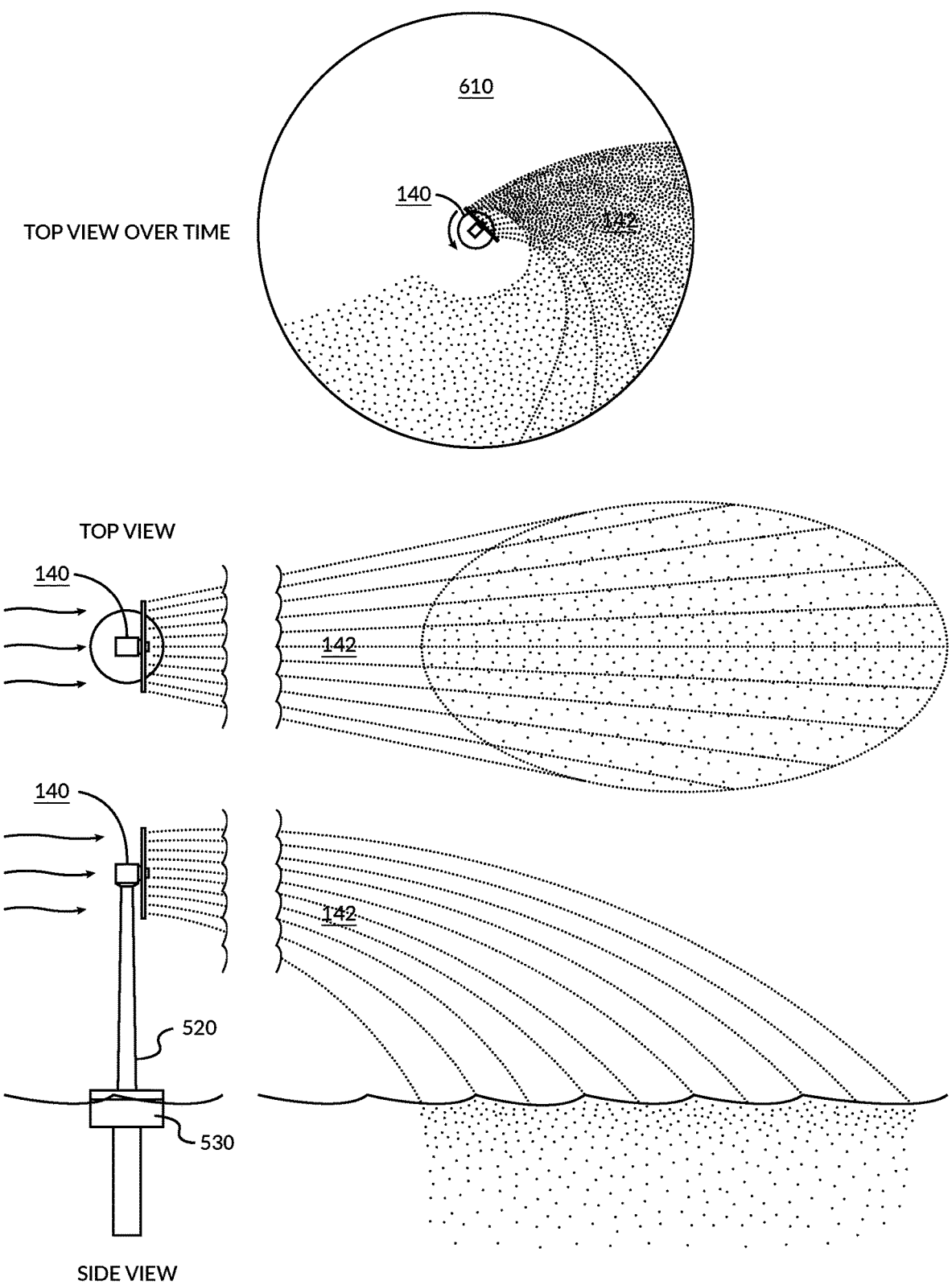
FIG. 6 illustrates a side view, a top view, and a time-lapse view of a sorbent dispersion pattern according to an embodiment of the invention.

FIG. 6 illustrates a side view, a top view, and a time-lapse view of a sorbent dispersion pattern according to an embodiment of the invention. As shown in the top drawing, rotation of the sorbent emitter apparatus 140 over time provides greater dispersion of the sorbent mist and more exposure to the sparse atmospheric $CO_2$ (417 ppm). By motoring the emitter apparatus 140, air movement is driven by the foiled spokes 244. During times with little wind, the radial emitter 140 is motored and slowly yawed, creating a longer, moving sorbent dispersal zone 610 around the platform and avoiding excess carbonates reaching the ocean surface in a narrow directional area.

Figure 7:
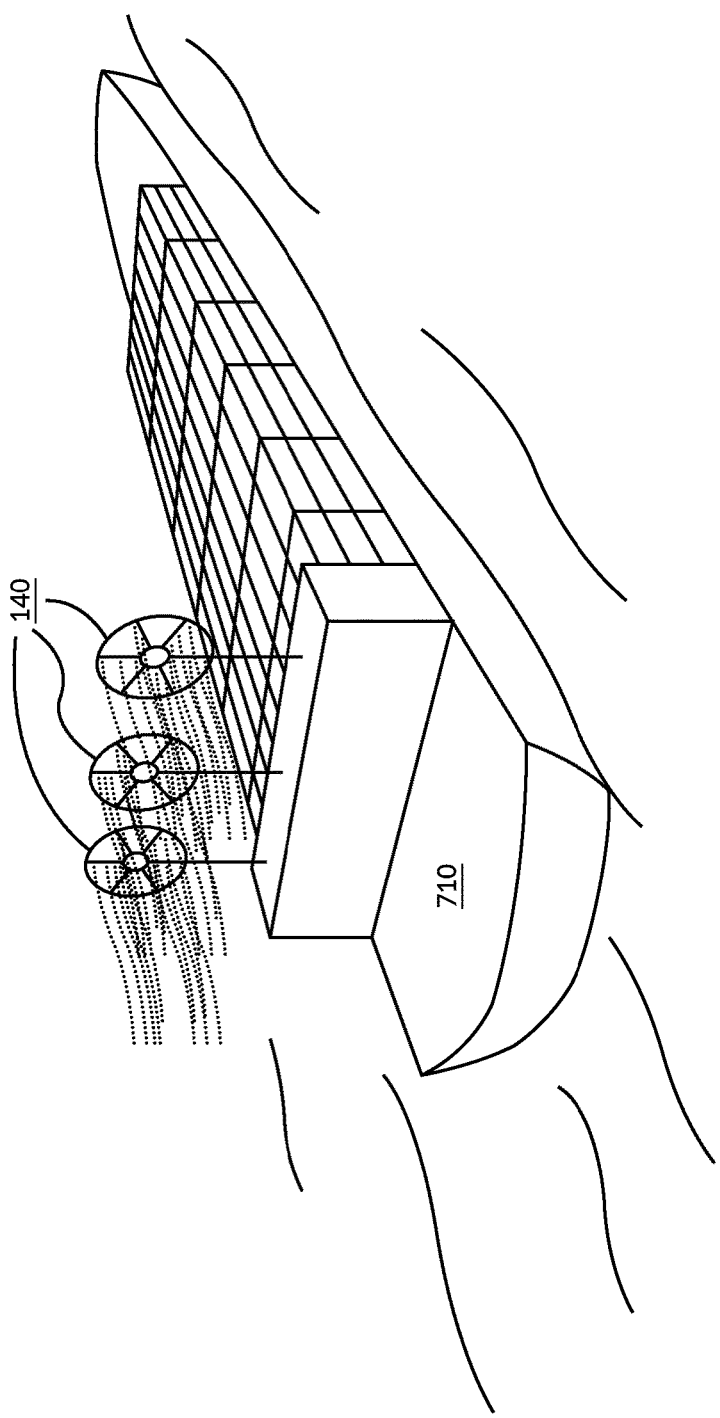
FIG. 7 illustrates sorbent emitters mounted on a ship according to an embodiment of the invention.

FIG. 7 illustrates sorbent emitters 140 mounted on a ship 710 according to an embodiment of the invention. A ship 710, such as a merchant vessel, provides a means for direct air capture of $CO_2$ when the ship is underway in the open ocean. Such vessels would load the sorbent onboard at portside and use onboard desalination to dilute the sorbent for emitter dispersal.

Offshore oil platforms located in windy regions are also candidate structures for sorbent emitters 140 because they usually have elevated platforms on which an emitter mast can be mounted. On the platform, the wind causes the emitter to freewheel, increasing the air passing the radial emitter nozzles for a greater rate of dispersal in air and sorbent-$CO_2$ reaction than by a fixed (non-rotating) structure.

The carbon capture capacity needed to stem global temperature rise using offshore wind turbines, marine hydrokinetic energy generators, and other offshore platforms to desalinate water and produce the sorbent onboard, offers a scale that can contribute a substantial part of the ten gigatons of $CO_2$ capture needed per year by 2050, as estimated by the Intergovernmental Panel on Climate Change (IPCC). There is a dire need for far more atmospheric dispersal of $CO_2$ sorbent in a tight time frame. A sorbent volume many times greater is required than can be available by onboard sorbent production, which is dependent on the power generated by an offshore wind turbine, marine current turbine, or wave generator.

The capacity for $CO_2$ capture is proportional to the volume of sorbent emitted. A much greater volume of sorbent delivered to an emitter will boost the capacity for $CO_2$ capture. The diameter of the radial emitter 140 can be adjusted to accommodate a far greater number of nozzles and sorbent dispersion capacity than is available by the sorbent produced with renewable energy onboard generators.

The many-fold increase (10 to 30 times greater) in sorbent mist dispersal is accomplished by importing dry sorbent or sorbent as a concentrated solution to the offshore platform, diluted with water for emission from the nozzles. An external, ample tonnage supply of dry or a concentrated sorbent solution to the offshore platform can be provided by an ocean floor pipeline connected to a shoreside sorbent source or tanker delivery to storage tanks of the dispersal platform.

In an embodiment of the invention, a system controller commands nozzle sorbent dispersion volume, and particle size is varied to optimize sorbent droplet size for air retention time when carried downwind depending on atmospheric conditions, including wind speed, temperature, and humidity. The controller commands nozzle dispersion characteristics and selects among groups of nozzles with the specific volume and particle size best suited to the prevailing atmospheric conditions. For example, with little or no wind, nozzles producing tiny sorbent particle size (~5-micron) make a very fine mist in the air that will drift for longer distances than larger droplets. However, larger droplets (30 to 50 microns) can be emitted in higher winds and drift long distances for more $CO_2$ exposure. Diffusing sorbent in a greater air volume creates more significant exposure to $CO_2$ molecules and enables more direct air capture of $CO_2$ as the drops coalesce and fall to the ocean. Nozzle operation by the controller is integrated with emitter yawing, airfoil pitch control depending on capturing energy for generating, powering to induce air movement and sorbent dispersion, or freewheeling with the wind.

The invention has been described herein using specific embodiments for illustration only. However, it will be readily apparent to one of ordinary skill in the art that the invention's principles can be embodied in other ways. Therefore, the invention should not be regarded as limited in scope to the specific embodiments disclosed herein; it should be fully commensurate in scope with the following claims.

I claim:

1. A carbon dioxide sorbent emitter system comprising:
   a sorbent emitter apparatus comprising
      a hub; and
      a plurality of spokes, wherein each one of the plurality of spokes is paired with an aerodynamic foil, each of the aerodynamic foils comprising a plurality of carbon dioxide sorbent emitting nozzles; and
   an offshore platform supporting the sorbent emitter apparatus above a marine surface.

2. The sorbent emitter system of claim 1, wherein the sorbent emitter apparatus further comprises a rim coupled to the plurality of spokes.

3. The sorbent emitter system of claim 1, wherein the offshore platform comprises a wind turbine generator or marine hydrokinetic energy generator, and a desalination system, wherein the wind turbine generator or marine hydrokinetic energy generator powers the desalination system, and the desalination system produces brine for processing into the carbon dioxide sorbent on the offshore platform.

4. The sorbent emitter system of claim 3, wherein the carbon dioxide sorbent is sodium hydroxide and emitted from the plurality of sorbent emitting nozzles.

5. The sorbent emitter system of claim 3, wherein the sorbent emitter apparatus is mounted to the wind turbine generator.

6. The sorbent emitter system of claim 1, wherein the hub and the plurality of spokes rotate about a horizontal axis.

7. The sorbent emitter system of claim 6, wherein the plurality of spokes rotate about an axis perpendicular to the hub axis.

8. The sorbent emitter system of claim 1, wherein a pitch of each of the aerodynamic foils is adjustable.

9. The sorbent emitter system of claim 1, wherein each of the aerodynamic foils comprises a carbon dioxide sorbent feeder tube and an air feeder tube to each nozzle, and the hub comprises a swivel tube connectors to the carbon dioxide sorbent feeder tube of each aerodynamic foil.

10. The sorbent emitter system of claim 1, wherein a size of the plurality of the carbon dioxide sorbent emitting nozzles is adjustable.

11. The sorbent emitter system of claim 1, wherein the offshore platform is a ship or oil drilling platform.

12. A method of dispersing carbon dioxide sorbent in a marine environment to remove and sequester atmospheric carbon dioxide, the method comprising the steps of:
   coupling a carbon dioxide sorbent emitter apparatus to an offshore platform, wherein the carbon dioxide sorbent emitter apparatus comprises a hub, a plurality of spokes, wherein each one of the plurality of spokes includes an aerodynamic foil, each of the aerodynamic foils comprising a plurality of carbon dioxide sorbent emitting nozzles, and the offshore platform supports the sorbent emitter apparatus above a marine surface; and
   dispersing carbon dioxide sorbent through the plurality of carbon dioxide sorbent emitting nozzles.

13. The method of claim 12, wherein the offshore platform comprises a wind turbine generator or marine hydrokinetic energy generator and a desalination system, and the method further comprises processing brine from the desalination system into the carbon dioxide sorbent.

14. The method of claim 12 further comprising the step of rotating the hub and the plurality of spokes about a horizontal axis.

15. The method of claim 12 further comprising the step of rotating the plurality of spokes about an axis perpendicular to the hub axis.

16. The method of claim 12 further comprising the step of adjusting a pitch of each of the aerodynamic foils.

17. The method of claim 12 further comprising the step of adjusting a size of the plurality of the carbon dioxide sorbent emitting nozzles.

18. The method of claim 12, wherein the offshore platform is a ship or oil drilling platform.

19. The method of claim 12, wherein the carbon dioxide sorbent is delivered by pipeline or transport vessel to the offshore platform.

20. The method of claim 13, wherein the plurality of carbon dioxide sorbet emitting nozzles disperse the carbon dioxide sorbent into a vortex wake of a rotor of the wind turbine generator.

* * * * *